United States Patent [19]
Zilly et al.

[11] Patent Number: 5,855,068
[45] Date of Patent: Jan. 5, 1999

[54] APPARATUS FOR CUTTING OF PLANTS

[75] Inventors: Guenter Zilly, Leinfelden-Echterdingen; Wilhelm Hepperle, Westerstetten; Beate Eger, Leinfelden-Echterdingen; Albert Ruess, Filderstadt; Klaus-Peter Schnelle, Ditzingen, all of Germany; Jan P. Houben, Chicago, Ill.; Bob Jung, Bergen op Zoom, Netherlands

[73] Assignee: Robert Bosch GmbH, Stuttgart, Germany

[21] Appl. No.: 732,234

[22] PCT Filed: Jan. 31, 1995

[86] PCT No.: PCT/DE95/00117

§ 371 Date: Dec. 12, 1996

§ 102(e) Date: Dec. 12, 1996

[87] PCT Pub. No.: WO95/26625

PCT Pub. Date: Oct. 12, 1995

[30] Foreign Application Priority Data

Mar. 30, 1994 [DE] Germany ............... 44 11 002.2

[51] Int. Cl.$^6$ .................................................. A01D 34/73
[52] U.S. Cl. .................................................. 30/276; 56/295
[58] Field of Search ..................... 30/296, 347; 56/12.7, 56/295

[56] References Cited

U.S. PATENT DOCUMENTS

| | | |
|---|---|---|
| 4,104,796 | 8/1978 | Sheldon .................... 30/276 |
| 4,151,646 | 5/1979 | Lane . | |
| 4,183,138 | 1/1980 | Mitchell . | |
| 4,259,782 | 4/1981 | Proulx . | |
| 4,347,666 | 9/1982 | Moore ......................... 30/276 |
| 4,483,069 | 11/1984 | Moore ......................... 30/276 |
| 4,660,286 | 4/1987 | Engelbrecht et al. ......... 30/276 |
| 4,738,058 | 4/1988 | Nishio . | |

FOREIGN PATENT DOCUMENTS

| | | |
|---|---|---|
| 0 168 254 | 1/1986 | European Pat. Off. . |
| 0 215 416 | 3/1987 | European Pat. Off. . |
| 0 525 195 | 2/1993 | European Pat. Off. . |

*Primary Examiner*—Hwei-Siu Payer
*Attorney, Agent, or Firm*—Michael J. Striker

[57] ABSTRACT

For a device for cutting plants with a cutting line (36, 38) which rotates around an axis of rotation and is wound on a reel (13), wherein a slide (16) releasably locks the reel (13) by means of a cam (26) with respect to elements which rotatingly take it along, wherein the length of the free end (37, 39) of the cutting line (36, 38) can be adjusted by unlocking the reel (13), wherein the slide (16) is displaced out of its locked position into its unlocked position by means of centrifugal force in the course of the shortening of the cutting line (36, 38), the cutting line adjustment is simplified and functionally improved in that the slide (16) is maintained in its locked position only by means of the force equilibrium of the mass support forces between its cam (26) and a detent (28) on the reel side, out of which it is displaceable by centrifugal force into its unlocked position, so that the reel (13) can rotate in respect to the cup (12), wherein the cam (26) is returned into the locked position by the mass support force on a guide surface (62) on the reel side and wherein the detent surface (250) of the detent (280) has an increasingly flattened contour with increasing distance from the reel center (12, 112).

14 Claims, 7 Drawing Sheets

APPARATUS FOR CUTTING OF PLANTS

BACKGROUND OF THE INVENTION

The invention relates to a device for cutting plants.

A device for cutting plants in accordance with EP 351 989 is already known, wherein after a stop the adjustment of the line length of the cutting line is controlled during the restart by means of a slide which can be displaced by centrifugal force and has cams. When the device or the motor is stopped, the cam or the slide is returned into the unlocked initial position by spring means. When being restarted, the reel, which is taken along inside the rotating cup, can turn in relation to it sufficiently far so that a detent on the reel comes to rest against the cam and terminates the rotation by this.

The known device operates dependably, but consists of comparatively many individual parts and, in case of wear on the cutting line or loss of the cutting line, requires the stopping and restarting of the device for adjusting the cutting line. Automatic adjustment of the lost length of line is impossible during operation.

A corresponding device for cutting plants is also known from U.S. Pat. No. 4,347,666. Here a slide which can be displaced transversely to the axis of rotation and has a cam, releases detents on the reel or stops them. The line adjustment is controlled with this during the cutting of plants. The centrifugal force-controlled slide is maintained in its locked original position by a spring, wherein the line adjustment only operates if the cutting line operates, i.e. cuts plants. The line adjustment does not function if the line rotates in the air without hitting material to be cut. If in the course of wearing the free end of the line falls below a defined critical length, i.e. when the line cannot reach any more material to be cut, the automatic line adjustment does not function. The device must be shut off so that the line adjustment can be performed manually.

A further device for cutting plants is known from U.S. Pat. No. 4,104,796, wherein two spring-supported cams, which can be displaced by centrifugal force, unlock or lock at least one detent on the reel. This results in an rpm-dependent automatic adjustment of the cutting line. Because of the springs, this device is constructed comparatively elaborately. The springs must be calibrated exactly and the actual mass must exactly correspond to the calculated mass of each cam support. Even small spring force deviations and mass differences can change the control characteristic of the line adjustment in such a way that it does not respond inside the predetermined rpm range. In addition, such mass-spring systems are extremely trouble-prone. Even small amounts of dust, moisture or heat can lead to the failure or too early triggering of the line adjustment device. Therefore these springs need to be cleaned and adjusted often.

Further than that, the spring characteristic of the springs changes as a function of the rpm because of the centrifugal forces acting on the springs. The springs can furthermore interferingly act on the centrifugal force displacement because of their own mass.

SUMMARY OF THE INVENTION

The device in accordance with the invention for cutting plants has the advantage that it is possible to completely omit force accumulators or springs as adjusting means. Instead, the adjustment means are realized by the design of the support surfaces between the line reel and the slide- or bolt-like reel arresting device. Its shape depends on the line mass and the centrifugal force of the line.

The production and maintenance efforts for the device are small because of the simple construction. The automatic line adjustment of the device operates dependably even under high dust, moisture and heat generation as well as with large rpm fluctuations and is clearly less trouble-prone than spring-equipped line adjustment devices.

The control behavior of the line adjustment device in accordance with the invention is particularly stable against fluctuations of the net rpm and against oscillations of the device motor or the device itself. The reason for this is that specially designed oblique support means are disposed between a slide seated on a cup, fixed against relative rotation but displaceably, and the cutting line reel.

An equilibrium of forces is produced between the force of the eccentric mass of the slide and the centrifugal force of the cutting lines which generate a torque at the reel. When the cutting line becomes too short, the cutting line centrifugal force decreases, so that the eccentric mass force become preponderant and the slide is displaced into the unlocked position. In this position the reduced line centrifugal force is sufficient to turn the reel in respect to the slide and to pull the cutting line toward the exterior, wherein it becomes longer and its centrifugal force is steadily increased. For limiting the cutting line length, the rotation of the reel is stopped after a defined rotation. For this purpose the slide is displaced into its locked position by means of the increased cutting line centrifugal force.

The force equilibrium between the slide and the reel in the locked position is maintained by the oblique support which is realized in a particularly advantageous manner by the concave shape of a detent surface of the reel in respect to the cam of the slide. In addition, because of the shape of the guide surface contour of a guide body, an equilibrium of forces is generated between the guide body and the cam of the slide in such a way that the sliding friction remains constant without changing into static friction.

Further advantages of the invention ensue from the characteristics of the dependent claims.

BRIEF DESCRIPTION OF THE DRAWINGS

An exemplary embodiment of the invention will be explained in more detail in the following description by means of the drawings.

DESCRIPTION OF PREFERRED EMBODIMENTS

Shown is in FIG. 1 a sectional representation of the view of the cup with the reel and the slide, FIG. 2 a lateral view of FIG. 1, FIG. 3 a lateral view of the reel, FIG. 4 a top view of the reel, FIG. 5 a view of the cam side of the slide, FIG. 6 an enlarged section of the upper front surface of the reel in accordance with claim 4 with the cam in the locked position in respect to the detent, FIG. 7 a section of the upper front surface of the reel in accordance with FIG. 6 with the cam displaced out of the locked position, FIG. 8 a section in accordance with FIG. 6 immediately following the release of the cam and FIG. 9 a section in accordance with FIG. 6 with the cam shortly before reaching the new locked position, FIG. 10 an exemplary embodiment of a mathematically/geometrically designed cam, detent and guide body in the course of a control step for line adjustment divided into ten parts, FIG. 11 a slide with the mathematically/geometrically embodied cam, FIG. 12 the cam in accordance with FIG. 11 in detail, FIG. 13 the spatial representation of the reel in accordance with FIG. 10, FIG. 14 a schematic representation of the reel with the control forces and FIG. 15 a mathematical curve in the X/Y coordinate system corresponding to the contour of the guide surface in accordance with FIGS. 10 and 13.

DESCRIPTION OF THE EXEMPLARY EMBODIMENT

Figure 1:
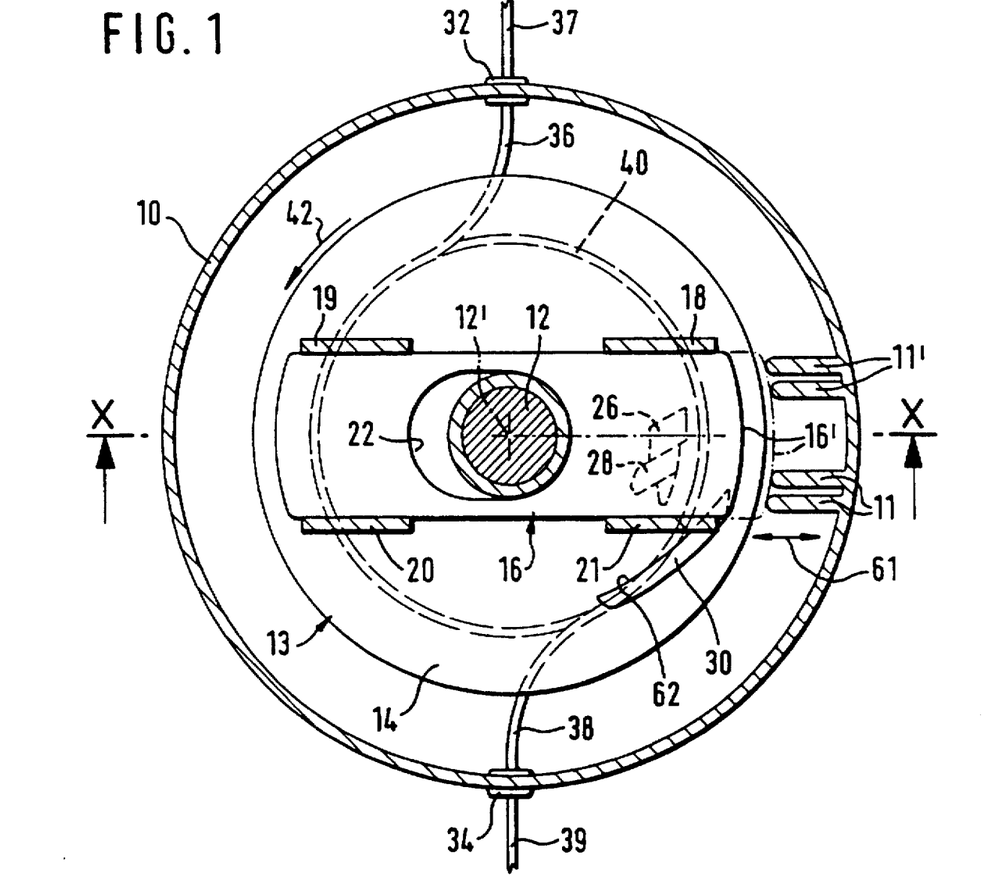

The top view, represented in FIG. 1, of a cup 10 at the lower end of a device, not shown, for cutting plants, which is connected, fixed against relative rotation, with a driveshaft 12, shows the reel 13 disposed centered therein with a view of its upper front surface 14 facing the machine, and a slide 16 seated on the cup side. The slide 16 is guided between four slide guides 18, 19, 20, 21 on sides opposite each other, and its radial deflection is limited by two pairs of elastic detents 11, 11' which prevent the slide from jamming in its detent position. The detent position of the slide 16 is identified by a dashed line in front of the front surface 16' drawn in heavy lines. The slide 16 has a central elongated hole 22 with a smaller diameter 23 and a larger diameter 24. The slide 16 supports a cam 26 of rhomboid cross section on its right side, when viewed in the represented direction, on the side facing the reel 13. The cam 26 is laterally supported on a detent 28 which is disposed, the same as an elongated guide body 30, protruding axially in the direction of the viewer on the front surface 14.

The free ends 37, 39 of a first and a second cutting line 36, 38 emerge radially outward at the circumference of the cup 10 respectively through an eye 32, 34. The edges of the free ends 37, 39 act as cutters because of the centrifugal force when the reel 13 rotates when the device is operated. In the process they are exposed to continuous wear because of pieces of the line being chipped off. The free ends 37, 39 are shortened by this.

The reel 13 is seated rotatable around the reel center 12' in respect to the cup 10. The locked position, in which the reel 13 is prevented from turning in respect to the cup 10, is achieved when the cam 26 rests against the detent 28 of the reel 13. The release position, where the detent 28 is freed, is achieved by radially displacing the cam 26 in respect to the detent 28. The reel 13 can then turn in respect to the cup 10. The locked and unlocked positions of the cam 26 are achieved by the automatic displacement of the slide 16 along the slide guides 18, 19, 20, 21 in accordance with the two-headed arrow 61.

The reel 13 supports a line winding 40 which is represented by two circles around the center of the driveshaft 12 shown in dashed lines. The free ends 37, 39 of the cutting lines 36, 38 make a curved transition into the line winding 40.

An arrow 42 indicates the direction of rotation of the reel 13 in respect to the cup 10 for adjusting the line length.

Figure 2:
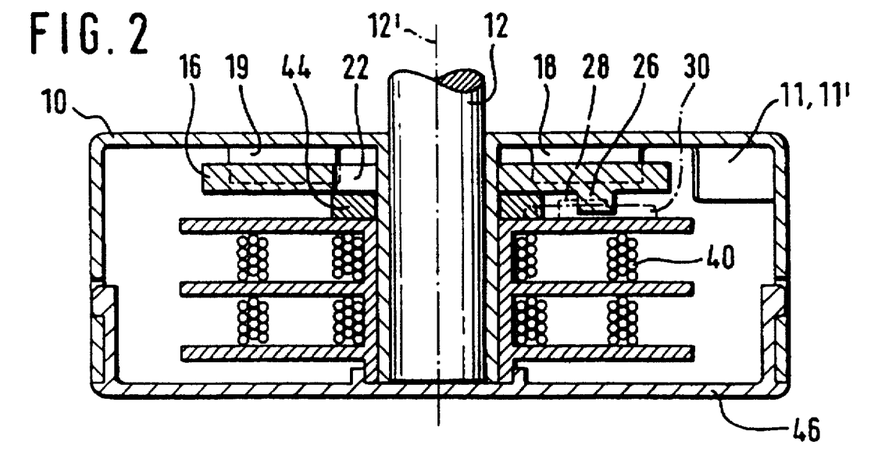

The lateral sectional representation of FIG. 1 in accordance with the arrows X—X shown in FIG. 2 explains the arrangement of the driveshaft 12 in respect to the cup 10, the position of the reel 13, which is embodied as a double reel, with the cutting lines 36, 38, and the position of the slide 16 with the cam 26. The arrangement of the slide 16 between the slide guides 18, 19, 20, 21 constituted by protrusions in the front surface of the cup 10, as well as the guide body 30, a spacer ring 44 and a cover 46 closing the cup 10 are clearly visible.

The spacer ring 44 secures an axial distance between the reel 13 and the slide 16 so that their axial fronts facing each other do not touch in order not to hamper the free displaceability and therefore the function of the slide 16.

Figure 3:
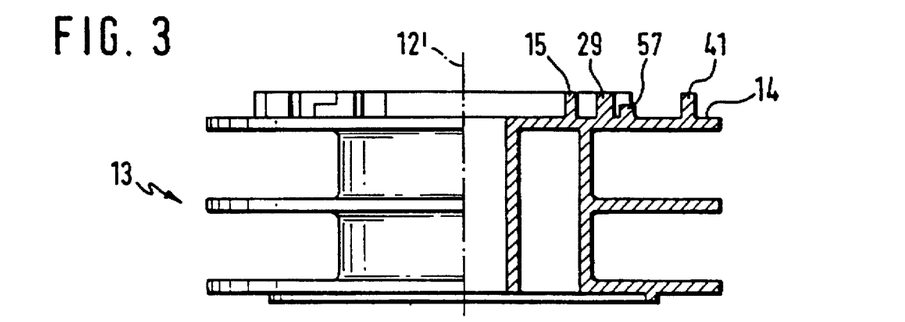

The reel 13, shown in FIG. 3 as a detail of a further exemplary embodiment of the invention in lateral partial section, can be recognized to be a double reel for receiving two cutting lines. A collar 15 as well as the detent 28 and the guide body 30 can be recognized on the upper front surface 14.

Figure 4:
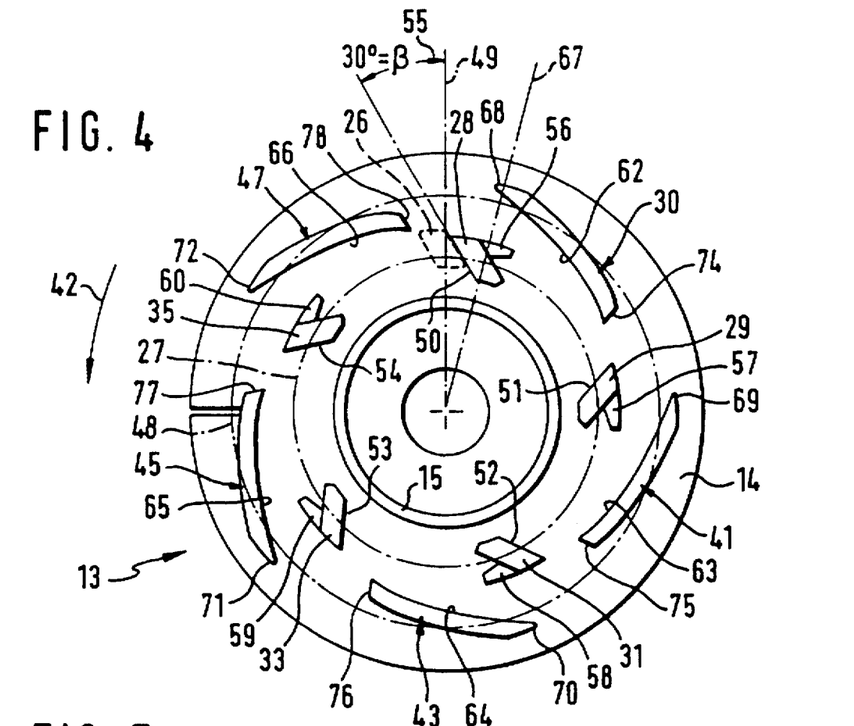

The top view in accordance with FIG. 4 on the front surface 14 of the reel 13 shows four detents 29, 31, 33, 35, which are identical with the first detent 28, are arranged at equal distances from each other on a first partial circle 27, and that four guide bodies 41, 43, 45, 47, which are identical with the first guide body 30, are arranged concentrically with the center of the reel 13 on a second partial circle 48 at equal distances from each other and from the detents 28, 29, 31, 33, 35. On their left side in the direction of viewing, the detents 28, 29, 31, 33, 35 respectively have one detent surface 50, 51, 52, 53, 54, on where oppositely-facing sides reinforcing ribs 56, 57, 58, 59, 60 are located. The guide bodies 30, 41, 43, 45, 47 have guide surfaces 62, 63, 64, 65, 66 on their respectively radially inward oriented sides. A radial line 67, passing through the center of the detent 28 and leading through the reel center, intersects or is tangent to at least the front end 68 of the guide body 30.

The sides of the guide bodies 30, 41, 43, 45, 47 respectively located opposite the front ends 68 to 72 determine their ends 74, 75, 76, 77, 78.

The detent surfaces 50 to 54 of the detents 28, 29, 31, 33, 35 extend inclined by 30° in respect to the radial line 49 rotated around the reel center in the direction of the arrow 42.

The guide surfaces 62 to 66 extend, curved from the front ends 68 to 72 to the ends 74 to 78, from the larger, second partial circle 48 to the smaller partial circle 27.

The contour of the cam 26 resting on the detent surface 50 of the first detent 28 is drawn in dash-dotted lines. Its position relative to the detent 50 in the locked position and its inclination by 30° in respect of a radial line 49 is shown in this way.

Figure 5:
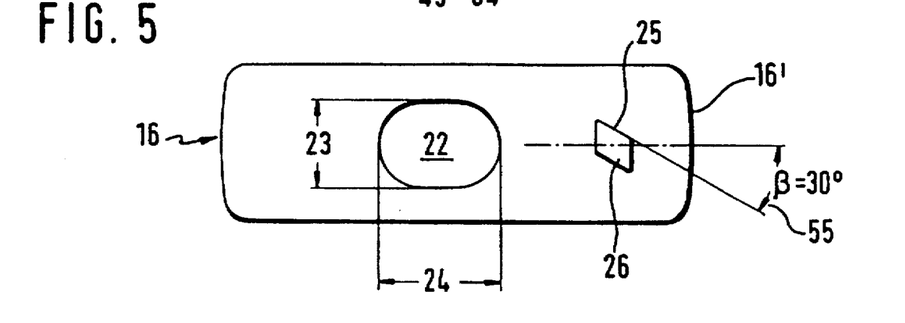

The side of the slide 16 facing the upper front surface 14 of the reel 13 is shown in FIG. 5, wherein its elongated hole 22 and the cam 26 can be clearly seen. The contact surface of the cam 26 can be seen extending at an angle β of approximately 30°, reference numeral 55, in respect to a center axis of the slide 16, not shown in detail.

Figure 6:
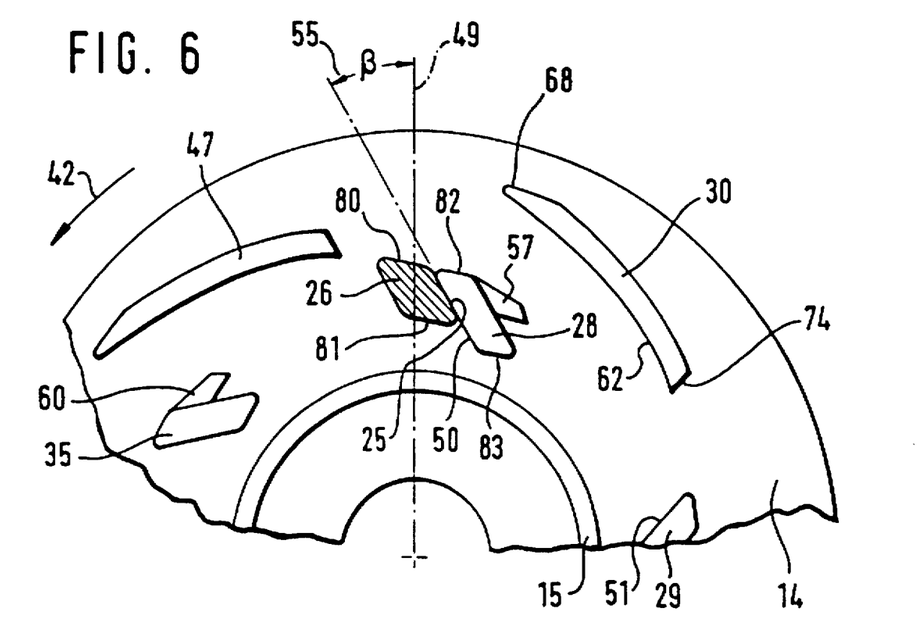

A segment-like section of the upper front surface 14 of the reel 13 is shown in FIG. 6, wherein the cam 26 is in its locked position in respect to the detent 28. The contact surface 25 is supported on the detent surface 50. Both surfaces extend at an angle β of 30°, reference numeral 55, in respect to the radial line 49. The detent 35 can be seen on the left side at a distance from the detent 28, and the detent 29 on the right side. Furthermore, the guide body 47 is to the left of the detent 28 in the viewing direction and to the right of it the guide body 30. The cam 26 has a radially exterior and a radially interior front surfaces 80, 81. The detent 28 has radially exterior and radially interior front surfaces 82, 83.

Figure 7:
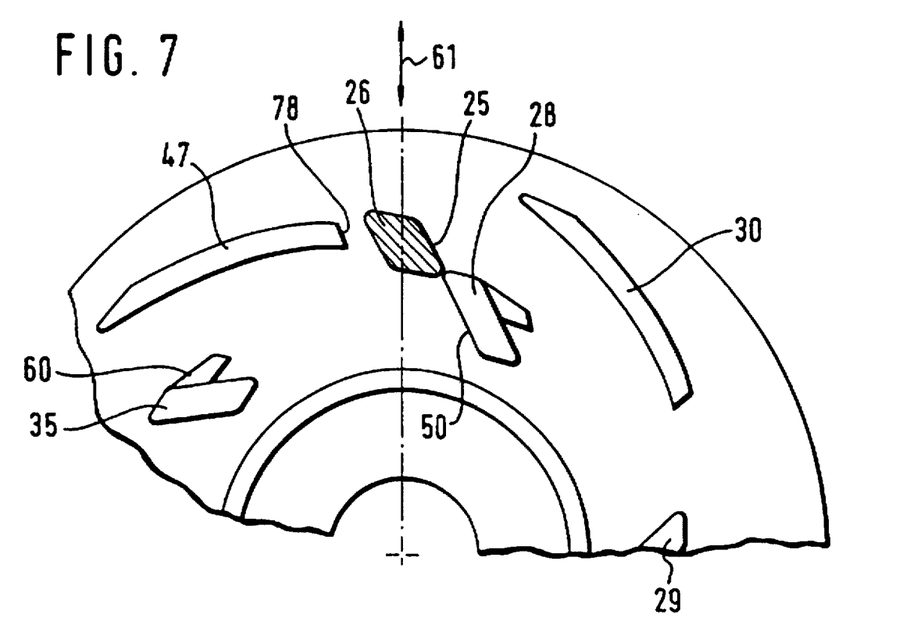

It is shown in FIG. 7 how the slide 16 moves the cam radially toward the outside because of the increase in centrifugal force caused by an rpm increase of the reel 13 because of shortened cutting lines, wherein the force equilibrium between the cam 26 and the detent 28 is changed such that the detent 28 and therefore the reel 13 are displaced toward the right in the viewing direction. In the process the static friction between the contact surface 25 and the detent surface 50 is changed to sliding friction. The cam 26 moves radially outward into its unlocked position between the end 78 of the guide body 47 and the detent 28. When the cam 26 has reached its end position and completely releases the detent 28, the latter can move underneath the cam 26 and past it.

Figure 8:
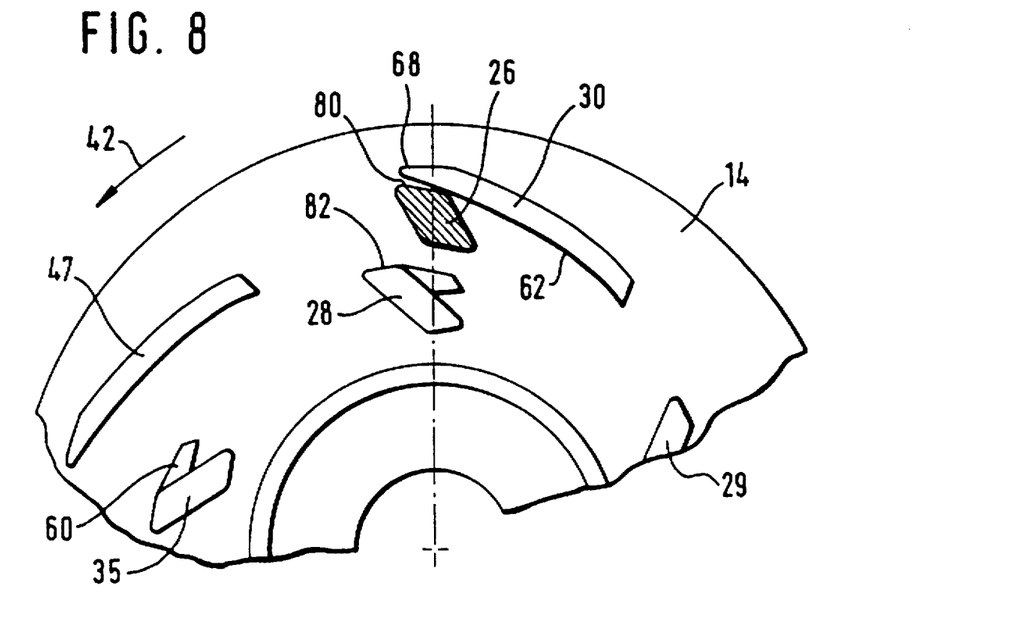

The cam 26 is shown in its radially outermost position in FIG. 8, wherein its radially outer front surface 80 is supported on the guide surface 62 of the guide body 30. The reel 13 has been turned further in accordance with the arrow 42 since the detent 28 is now no longer blocked by the cam 26.

Figure 9:
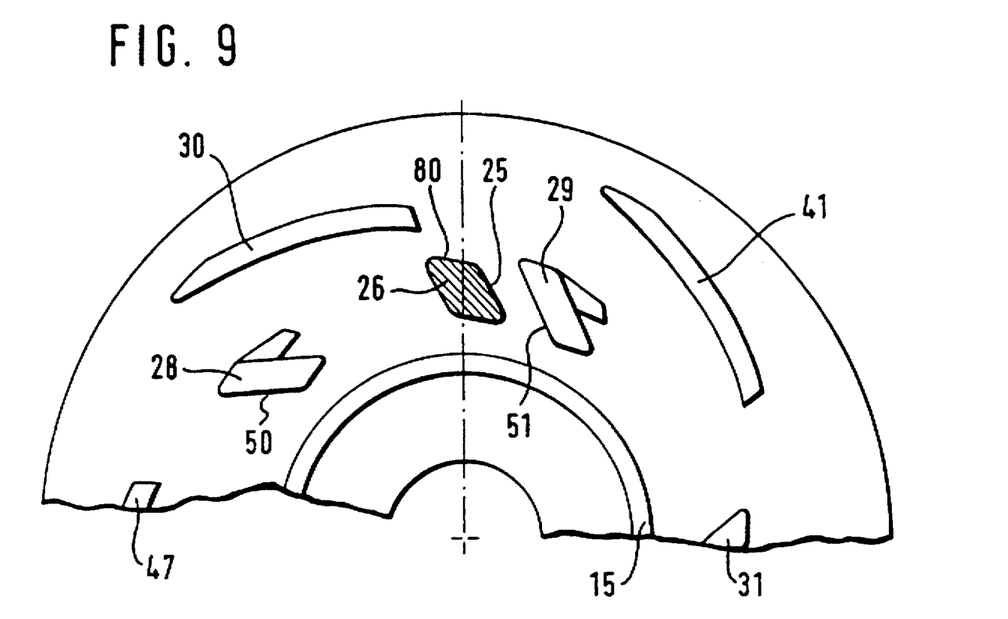

In FIG. 9 the cam 26 is shown shortly before reaching its new locked position in respect to the detent 29, wherein it has been displaced into its radially inner position by the guide surface 62 at the end 74 of the guide body 41.

It can be seen from FIGS. 6 to 9 that the cam 26 or the slide 16 are moved between their unlocked and locked positions without a spring force, only by inertial forces, and are maintained on the oblique contact surfaces 25 and respectively one of the detent surfaces 50 of the detents 28, 29, 31, 33, 35, which are identical to each other, only by the equilibrium of the forces.

The inclination of the contact surface 25 or the detent surface 50 by the angle β, 30°, in respect to the radial line 49 has been selected as a function of the reel diameter, the mass of the reel, the operating rpm of the reel and the possible difference rpm because of worn cutting lines 36, 38, and can of course be greater or less in connection with a device in accordance with the invention having different parameters.

The distance of the detents 28, 29, 31, 33, 35 from each other on the partial circle 27 corresponds to the adjustable line length by which a shortened cutting line 36, 38 is respectively automatically lengthened again.

It is customary to cut off excess lengths of the cutting line, which might have been possibly set, by means of a limiting cutting edge in the movement path of the cutting line on the housing of the device, and to automatically maintain the length of the free ends 37, 39 nearly constant in this way.

The stroke of the slide 16 is limited by the difference between the greater diameter 24 of the elongated hole 22 and the diameter of the driveshaft 12 and by the resilient detents 11, 11' against which the front surface of the slide 16 comes to rest when maximally deflected. The side of the slide 16 to the left in the viewing direction in accordance with FIG. 1 is lighter than the side with the cam 26 to the right in the viewing direction.

The mass difference between the two sides has been calculated in such a way that at a defined rpm of the cup 10, in particular with a defined cutting line length, the force moving the slide 16 radially is greater than the radial counterforce component between the contact surfaces 25 of the cam 26 and the detent surface 50 of the detent 28 or correspondingly of the other detents 29, 31, 33, 35.

Figure 10:
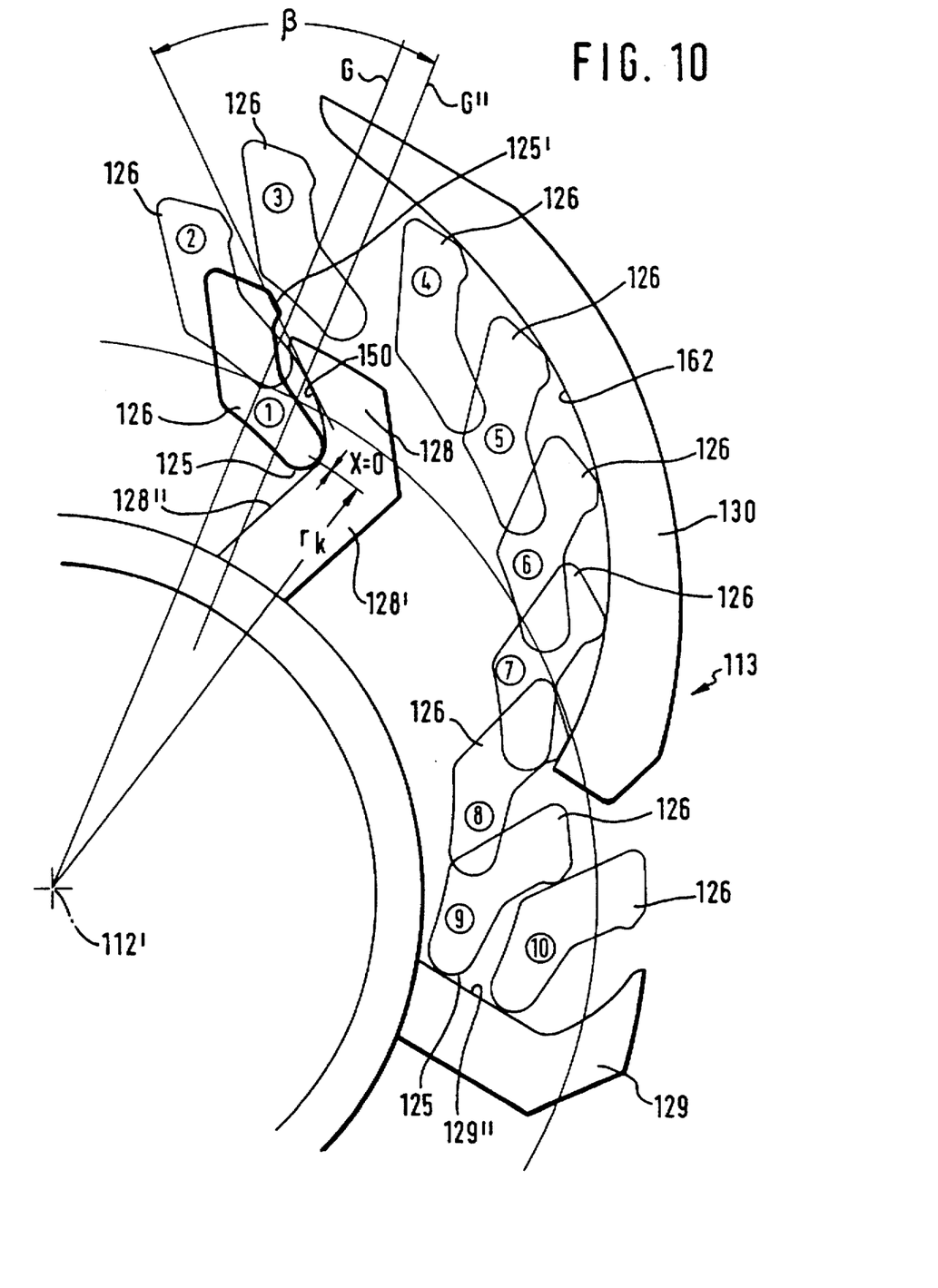

A reel 113 is shown in FIG. 10 cam 126 is shown on its path, divided into ten individual steps, between the detent 128 and the adjoining detent 129 along the guide body 130. The path is divided ten times, wherein the cam in its respective positions 1 to 10 is identified with the numerals 1 to 10. The cam 126 is shown without the slide supporting it. The latter should basically be designed the same as the slide 16 in accordance with FIG. 1.

The cross section of the cam 126 is kidney-shaped. Its lower end in the viewing direction has a first curved sliding surface 125. It is used for support on the contact edge 128" and on the concave flattened detent surface 150 of the detent 128. The cam 126 has a second sliding surface 125' on its upper end for sliding along the concave guide surface 162 of a guide body 130.

The detent 128 has a hook-shaped cross section. A straight arm 128' of the detent 128, which is inclined in respect to the radial line, constitutes the contact edge 128" facing the cam 126 and makes a transition radially outward into the detent surface 150. The concave detent surface 150 has an inclination β in respect to a straight line G" extending parallel with the straight line G. In this case the straight line G corresponds to the axis of symmetry of the slide, not shown, which supports the cam 126 and determines its displacement path x. The angle β increases with the increasing distance between the detent surface 150 and the reel center 112'. The flattening of the contour of the detent surface 150 is the result of this.

In its course, the contour of the detent surface 150 of the detent 128 essentially follows the following mathematically defined dependency of the angle β on the displacement path X of the cam 126 along the straight line G:

$$\frac{\cos\beta - \mu\sin\beta}{\sin\beta + \mu\cos\beta} = \frac{k_{schalt}}{m_s(e_s + x)(r_k + x)}$$

In accordance with the above equation, $r_k$ identifies the distance between the axis of rotation and the contact point at a cam displacement path X=0, i.e. when the sliding surface 125 of the cam 126 rests against the detent surface 150 as well as the contact edge 128" of the detent 128, $m_s$ the mass of the slide, $e_s$ the eccentricity and $k_{schalt}$ the quotient of the unlocking moment $M_{schalt}$ and the square of the angular speed omega, a calculated value. The sliding value of the contact is μ. The unlocking moment $M_{schalt}$ is the result of the minimal centrifugal force and its effective lever which is determined from the winding radius. Six points of the contour of the detent surface 150 in accordance with FIG. 10 result from inserting the following values into the above mentioned equation: $m_s$=6.3 g, $e_s$=5 mm, $r_k$=20.5 mm, $K_{schalt}$=883.4 g×mm², μ=0.2, with the following result:

| x(mm) | 0 | 1 | 2 | 3 | 4 | 5 |
|---|---|---|---|---|---|---|
| cosβ − μsinβ / sinβ + μcosβ | 1,368 | 1,087 | 0,89 | 0,746 | 0,636 | 0,55 |
| β(°) | 24,8 | 31,3 | 37,0 | 42,0 | 46,2 | 49,9 |

The guide body 130 has a guide surface 162 along which the cam 126 slides with its second sliding surface 125' on the way into its locked position at the adjoining detent 129. The sliding surface 162 of the guide body 130 terminates at a radial distance from the reel center 112' which is less than the radial distance of the detent surface 150 of the detent 128 from the reel center 112'.

The sequence of movements of the cam 126 begins in the position identified by the numeral 1. Here, the cam 126 is in its locked position with a displacement path=zero, or at $r_k$, and is supported on its sliding surface 125 on both the contact edge 128" and also on the detent surface 150 of the detent 128.

With its contact edge 125, the cam 126 with the numeral 2 has reached the end of the detent surface 150 of the detent 128, wherein, by its radial movement, it has displaced the detent 128 and with it the entire reel 113 toward the right in the viewing direction, because on account of a shortened cutting line its centrifugal force is less than the centrifugal force of the slide supporting the cam 126. Because of this the cam 126 can move further radially outward into the unlocked position identified by the numeral 3. This position is defined by detents which limit the path of the slide— corresponding to the slide 16 and the detents 11 described in connection with FIG. 1.

The cam 126 with the numeral 4. cannot move further radially outward out of the locked position, but instead the guide surface 162 of the guide body 130 slides along it or its sliding surface 125', wherein the reel 113 rotates around the reel center 112' to the left in the viewing direction. In the process the sliding surface 125' of the cams 126 with the numerals 5, 6, and 7. rests against the sliding surface 162 with an increasingly larger portion of surface, wherein the cam 126 is guided radially inward.

In the course of its sliding along the sliding surface 162 —by means of further rotation of the reel 113 as a result of the cutting line length increasing with the relative movement and its correspondingly increasing centrifugal force—the cam 126 with the numeral 8 has arrived in its radially inner end position.

The cam 126 with the numeral 9 rests with its sliding surface 125 against the contact edge 129" of the detent 129 and here assumes its position, which lies radially the farthest inward, in respect to the reel center 112'. The cam 126 with the numeral 10 again moves radially outward in order to take up the same position in respect to the detent 129 as that of the cam 126 identified with the numeral 1. in respect to the detent 128.

The control step for line adjustment is terminated with this. Further control steps of the same kind take place as soon as the cutting line has become too short.

Figure 11:
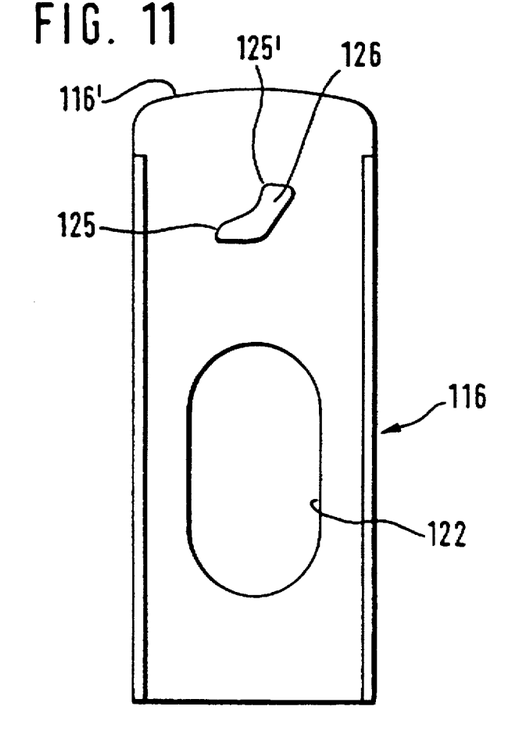

FIG. 11 shows a view of the side of the slide 116 having an edge 116' and facing the reel 113 with the cam 126 in accordance with FIG. 10 and explains the position of the sliding surfaces 125, 125' in respect to the elongated hole 122, which corresponds to the elongated hole in accordance with FIG. 5.

Figure 12:
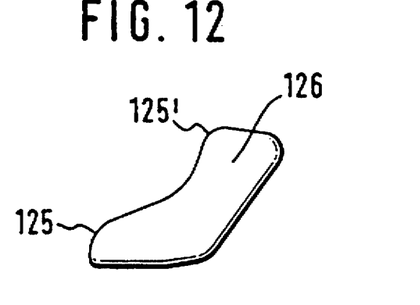

FIG. 12 shows the cam 126 in accordance with FIG. 11 in a top view in detail, wherein the sliding edges 125, 125' are clearly recognizable.

Figure 13:
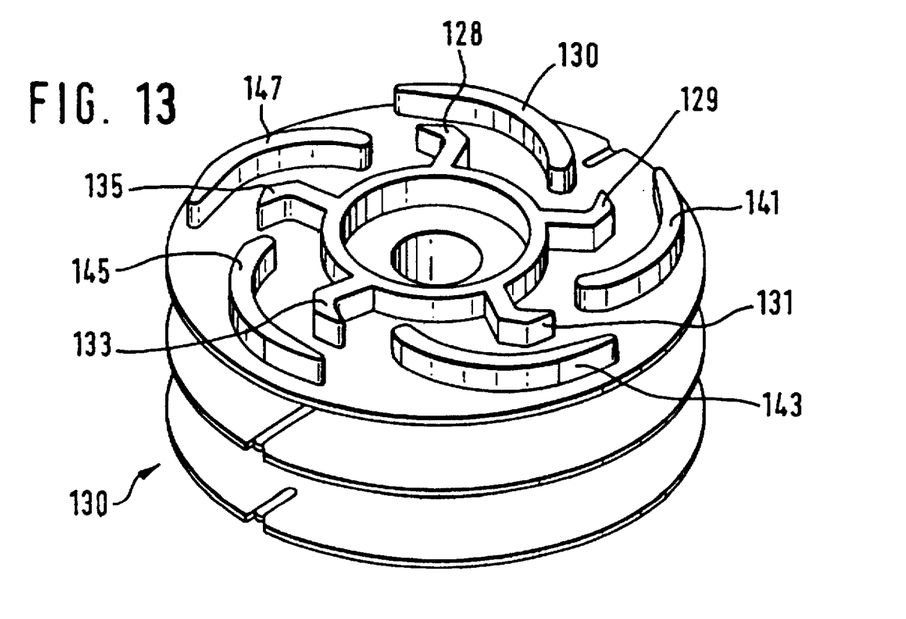

FIG. 13 shows a complete spatial representation of the reel 113 in accordance with FIG. 10 with the detents 128, 129, 131, 133, 135 and the guide bodies 130, 141, 143, 145, 147.

Figure 14:
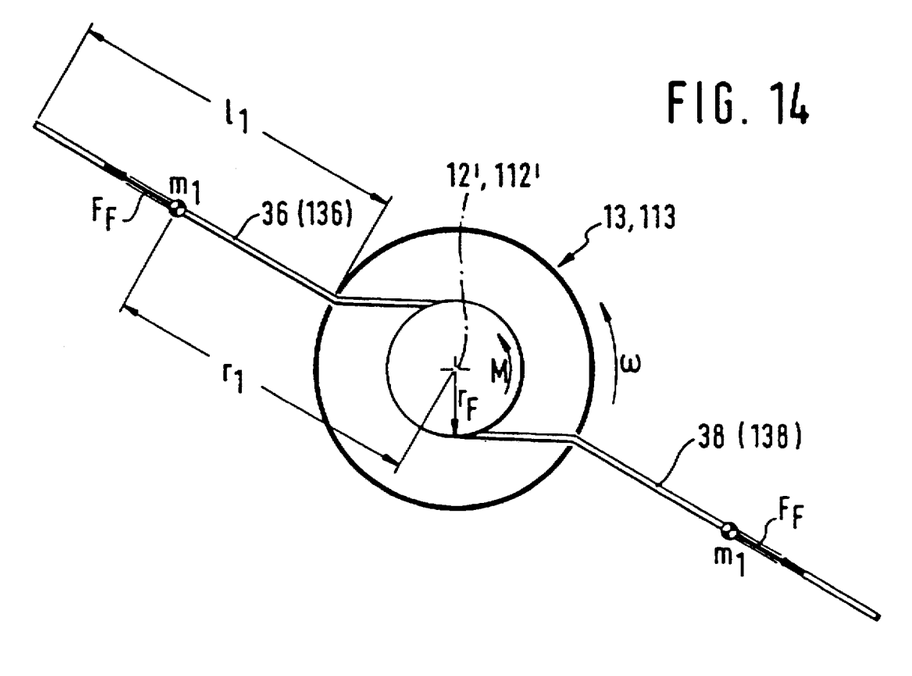

FIG. 14 shows a schematic representation of the reel 13, 113 with the outwardly extending cutting lines 36, 38; 136, 138 and with the active dynamic forces. The reel moment M acting around the reel center 12'; 112' is the product of the centrifugal force of the rotating lines $F_F$ and the winding radius $r_F$. The centrifugal force $F_F$ is the product of the line mass m1 (measured in the line direction from the reel center 12; 112'), of the center of gravity distance $r_1$ of the line and the square of the angular speed w.

The reel moment and the centrifugal force are maintained in equilibrium by the design of the slide or by the geometry of the cam 126, the detent 128 and the guide body 130 in such a way that triggering of the line adjustment cannot take place accidentally, but only if the cutting line has fallen below a defined minimal length and must actually be adjusted, wherein at the end of the cutting line adjustment process the cam 126 has again attained a locked position equal to the original one, from where it can be displaced into the unlocked position an arbitrary number of times, so that the line adjustment corresponding to the first control step can be repeated until the cutting line is used up.

Figure 15:
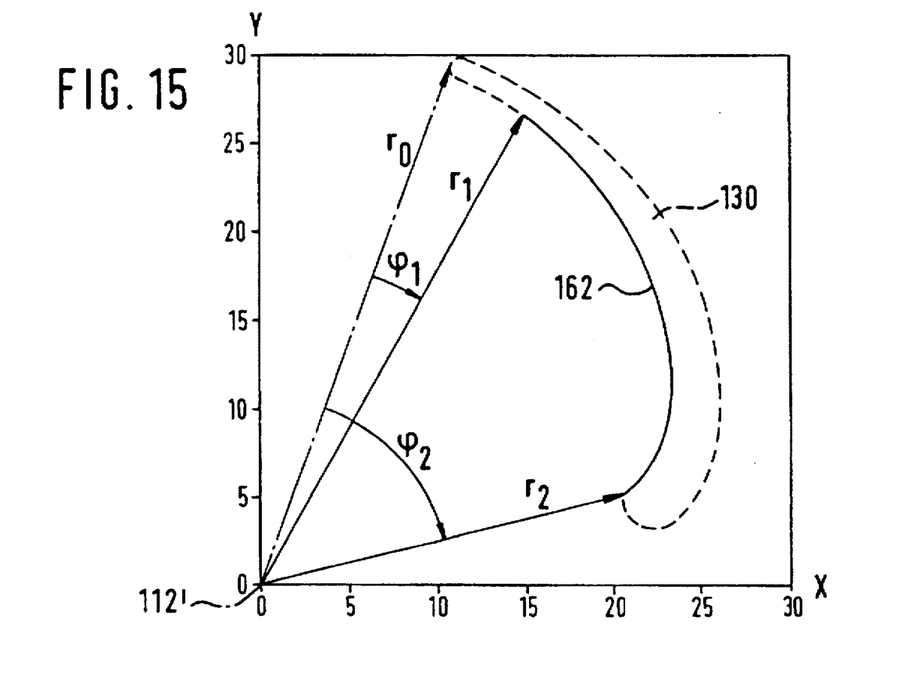

FIG. 15 shows a curve corresponding to the course of the contour of the guide surface 162 in accordance with FIG. 10, and which is represented or defined in polar coordinates, i.e. the values for $r_1$ to $r_2$ associated with angular positions from $\phi_1$ to $\phi_2$ of the engagement point of the sliding surface 125' in respect to the sliding surface 162 can be determined.

So that, as described in connection with FIG. 10, the cam 126 is actually returned into its position corresponding to the prior position, the contour of the guide surface 162 of the guide body 130 is designed in such a way that it follows the mathematical equation:

$$\frac{dr}{d\phi} = r\frac{z(\phi)r \cdot \mu + (\mu^2 - 1)M(\phi)}{Z(\phi)r + 2\mu M(\phi)} = F(r, \phi)$$

In accordance with the above equation, r indicates the distance between the guide surface 162 and the reel center 112', dr an infinitesimally small part of r, $\phi_1$ to $\phi_2$ the angles between a reference radial $r_O$ which leads through the end to the left in the viewing direction of the guide body 130, and a radial of the first or last engagement point of the sliding surface 125' of the cam 126 with the guide surface 162 of the guide body 130, Z the centrifugal force at the cam 126, $\mu$ the coefficient of friction between the surface 125' and the contour 162, and M the reel moment resulting from the centrifugal force of the line and its effective lever around the reel center 112', wherein the lever is determined from the winding radius of the cutting line.

The angular speed is not contained in this equation. This means that the force equilibrium can be set independently of the angular speed of the reel 113. The contour of the sliding surface 162 of the guide body 130 in accordance with FIG. 10 and 15 is designed by the numerical evaluation of the equation, or in accordance with the course of the curve in the x–y coordinate system in accordance with FIG. 15 which corresponds to the surface of the reel width, wherein the intersection of the x–y axes corresponds to the reel center 112'.

The mathematical relationship on which this course of the curve is based determines a course for the guide surface 162, by means of which a force equilibrium occurs at each point between the cam 126 and the guide surface 162, in which there is always sliding friction close to the line with static friction for a predetermined coefficient of friction $\mu$. The start and end of the sliding surface 162 is determined by a sector which is determined in correspondence with the minimal line adjustment length. The arrangement of the detent 128 with respect to the guide body 130 is also determined by this sector.

The course of the contour of the guide surface 162 assures that the cam 26, 126 does not become jammed on the guide surface 62; 162, even at a possibly higher coefficient of friction between the cam 26; 126 and the guide surface 62; 162. Thus, the system needs to have an easier action than that calculated from the mathematically ideal case.

Experience has shown that with coefficients of friction $\mu$=0.1 to 0.15 the return of the cam 126 by sliding along the guide surface 162 functions without trouble. In particular, the stick-slip effect known in connection with movement sequences in the border area between static friction and sliding friction is assuredly prevented by this.

The exemplary embodiment for the contour of the guide surface 162 in accordance with FIG. 15 was based on the following values:

Line density 0.023 g/mm

Housing radius $r_G$ 45 mm

Starting line length $l_0$ 95 mm

Winding radius $r_F$ 20 mm

Slide mass m 6.3 g

Center of gravity distance a 19.1 mm

Starting point of the guide surface 162 rl=32.1 mm with $\phi$1=0.1262 rad

End point of the guide surface 162 $r_2$ =20.9 mm with $\phi_2$=0.986 rad.

We claim:

1. A device for cutting plants with at least one cutting line (36, 38) which rotates around an axis of rotation (12; 112) and extends radially away from it, which is wound on a reel (13; 113) which is disposed in a rotatingly driven cup (10) and has at least one opening on its circumference, through which a free end (37, 39) of the cutting line (36, 38) extends to the outside, wherein a slide (16,116), which is secured against relative rotation and is guided radially displaceably with respect to the axis of rotation (12; 112), locks the reel (13; 113) secure against relative rotation or unlocks it with respect to the cup (10) by means of a cam (26; 126), so that the length of the free end (37, 39) of the cutting line (36, 38) can be adjusted by rotating the reel (13; 113) with respect to the cup (10), wherein the slide (16; 116) is displaced out of its locked position into its unlocked position by means of centrifugal force in the course of the shortening of the free end (37, 39) of the cutting line (36, 38), characterized in that a detent (28;128) is provided and arranged so that by means of the force equilibrium of the mass support forces between its cam (26; 126) and the detent (28; 128) on a reel side the slide (16; 116) is maintained in its locked position, out of which it is displaced by centrifugal force into its unlocked position and is, during the relative rotation of the reel (13; 113) with respect to the cup (10), released, and returned into the locked position by the mass support force between its cam (26; 126) and a guide surface (62; 162) of a guide body (130) formed on the reel (13; 113).

2. The device in accordance with claim 1, characterized in that the cam (26; 126) has a lateral contact surface (25) or sliding surfaces (125; 125'), with which the cam (26; 126) is supported on a detent surface (50; 150) of the detent (28; 128), wherein the contact surface (25) or the sliding surfaces (125; 125') and the detent surface (50; 150) are disposed preferably inclined by 30° with respect to the displacement direction of the cam (26; 126).

3. The device in accordance with claim 2, characterized in that with its increasing radial distance from a driveshaft (12; 112), the detent surface (150) of the detent (128) has an increasingly flattened contour.

4. The device in accordance with claim 3, characterized in that the contour of the detent surface (15) is concavely curved.

5. The device in accordance with claim 3, characterized in that the contour of the detent surface (150) is predetermined in the following way by linking the ascending angle $\beta$ and the displacement path x of the cam (126) in the following mathematical equation:

$$\frac{\cos\beta - \mu\sin\beta}{\sin\beta + \mu\cos\beta} = \frac{k_{schalt}}{m_s(e_s + x)(r_k + x)} \; ; \text{wherein}$$

$r_k$ is the distance between the axis of rotation and the contact point X=0, $\mu$ is the coefficient of friction; $m_s$ is the mass of the slide, $e_s$ is the eccentricity of the slide and $k_{schalt}$ is a calculated value of the quotient of the unlocking switch moment $M_{schalt}$ and the square of the angular speed omega of the reel.

6. The device in accordance with claim 1, characterized in that the detents (28, 29, 31, 33, 35) has reinforcement ribs (56, 57, 58, 59, 60) on its backs.

7. The device in accordance with claim 1, characterized in that on a smaller partial circle (27) the reel (13) supports detents (28, 29, 31, 33, 35) at even distances, and guide bodies (30, 41, 43, 45, 47) on a larger partial circle (48).

8. The device in accordance with claim 7, characterized in that the distance between the two partial circles (27, 48) is greater than the greatest radial width of the cam (26).

9. The device in accordance with claim 1, characterized in that the cup (10) has at least one elastic detent (11) which limits the radial displacement of the slide (16).

10. The device in accordance with the preamble of claim 1, characterized in that a detent surface (150) of the detent (128) has an increasingly flattened contour with increasing radial distance from a reel center (112').

11. The device in accordance with claim 10, characterized in that the contour of the detent surface (150) is curved with respect to the cam (126) and is concave.

12. The device in accordance with claim 10, characterized in that the contour of the detent surface (150) is determined in the following manner by linking the ascending angle $\beta$ and the displacement path X in the following mathematical equation:

$$\frac{\cos\beta - \mu\sin\beta}{\sin\beta + \mu\cos\beta} = \frac{k_{schalt}}{m_s(e_s + x)(r_k + x)} \; ; \text{wherein}$$

$r_k$ is the distance between the reel center (112') and the contact point X=0, $\mu$ is the coefficient of friction; $m_s$ is the mass of the slide, $e_s$ is the eccentricity and $k_{schalt}$ is a calculated value of the quotient of the unlocking switch moment $M_{schalt}$ and the square of the angular speed omega of the reel (113).

13. The device in accordance with claim 10, characterized in that the contour of the detent surface (150) is determined by two straight lines extending at an angle with each other.

14. The device in accordance with claim 1, characterized in that the contour of the guide surface (62; 162) of the guide body (130) is determined in the following manner by linking the ascending angle x in respect to radial R passing through the reel center (12'; 112') in the following mathematical equation:

$$\frac{dr}{d\phi} = r\frac{z(\phi)r \cdot \mu + (\mu^2 - 1)M(\phi)}{Z(\phi)r + 2\mu M(\phi)} = F(r, \phi)$$

wherein:

r—means the distance of the guide surface (162) from the reel center (112')

dr—means an infinitesimally small part of r $\phi$—means the angle of the guide surface (162) measured on the radial from the contact point through the reel center (112') and a diagonal reference line Z—means the centrifugal force at the cam (126)

$\mu$—means the coefficient of friction between the sliding surface (125') of the cam (126) and the contour of the guide surface (162)

M—means the reel moment.

* * * * *